Aug. 17, 1943.                R. H. WHISLER, JR                    2,327,295
              DOUBLE-ACTING VELOCITY TYPE SHOCK ABSORBER
                           Filed Nov. 12, 1941
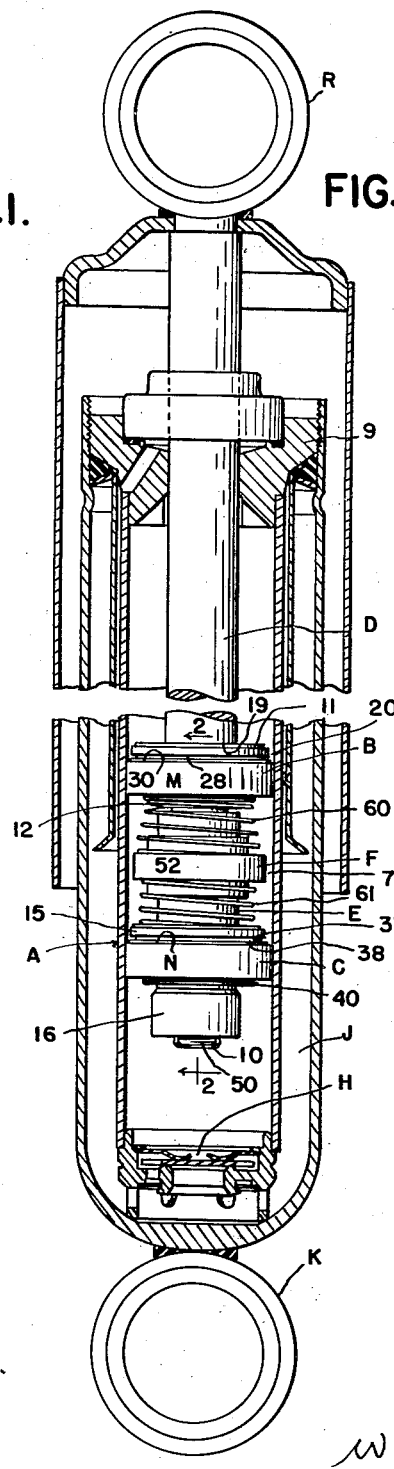
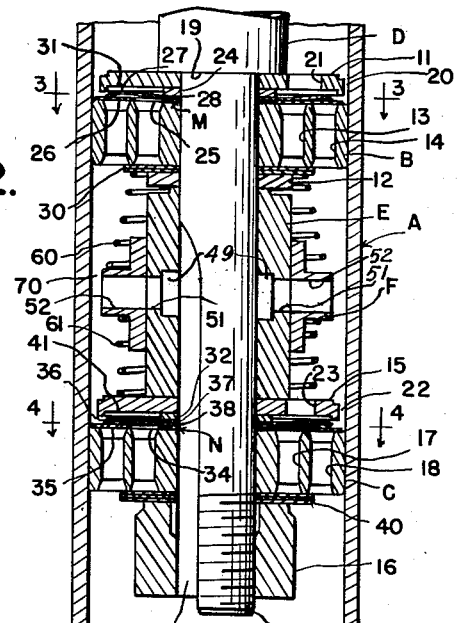
INVENTOR.
RALPH H. WHISLER JR.
BY
Whittemore Hulbert & Belknap
ATTORNEYS Patented Aug. 17, 1943

2,327,295

UNITED STATES PATENT OFFICE 2,327,295

DOUBLE-ACTING VELOCITY TYPE SHOCK ABSORBER

Ralph H. Whisler, Jr., Monroe, Mich., assignor to Monroe Auto Equipment Company, Monroe, Mich., a corporation of Michigan Application November 12, 1941, Serial No. 418,792

17 Claims. (Cl. 188—88)

This invention relates generally to shock absorbers and refers more particularly to hydraulic shock absorbers of the double-acting type.

Heretofore shock absorbers have been provided with a certain amount of resistance to vehicle spring amplitudes and shock absorber speeds, but usually there is insufficient resistance to compensate for increase in movements of the shock absorber or there is no provision to give increased shock absorber resistance for increased vehicle spring amplitudes and shock absorber speeds. As a result, the shock absorber does not function properly to obtain a smooth, even ride.

In the present instance, I have overcome the difficulties heretofore encountered by providing two stages of resistance on both compression and rebound of the shock absorber. Thus, this arangement will not only take care of normal shocks but will give increased resistance for increased spring amplitudes and shock absorber speeds. Preferably the low stage resistance will give ample but soft control for general absorber speeds. Preferably the low stage resistance will give ample but soft control for general boulevard riding; while the high stage resistance will handle severe riding conditions. Moreover, my construction includes a control capable of providing any amount of resistance between the low and high stages mentioned which might be necessary for any given shock absorber speed.

In the accompanying drawing:

Figure 1 is a fragmentary vertical sectional view through a shock absorber embodying my invention;

Figure 2 is an enlarged fragmentary vertical sectional view taken substantially on the line 2—2 of Figure 1;

Figure 3 is a cross sectional view taken substantially on the line 3—3 of Figure 2;

Figure 4 is a cross sectional view taken substantially on the line 4—4 of Figure 2.

Referring now to the drawing, A is the compression cylinder, B and C, respectively, are piston sections adapted to reciprocate within the cylinder, D is the actuating rod for the piston sections, E is a sleeve on the rod between the piston sections, and F is a slide on the sleeve of a shock absorber construction embodying my invention.

In the present instance, the compression cylinder A may be provided at its upper end with any suitable closure 9 sleeved on the piston rod D and is preferably provided at its lower end with a compression valve assembly H for controlling the flow of a suitable hydraulic medium, such as oil, between the cylinder A and a suitable reserve chamber J enclosing the compression cylinder and having a head K for attachment to the unsprung weight of a vehicle.

The piston sections B and C are carried by a reduced lower end portion 10 of the rod D and slidably engage the walls of the compression cylinder A. Preferably the section B is between washers 11 and 12, respectively, at the upper end of said reduced portion 10 and has two series of ports 13 and 14, respectively, for the hydraulic medium, while the section C is between a washer 15 and a retaining nut 16 at the lower end of the reduced portion 10 and has two circular series of ports 17 and 18, respectively, for the hydraulic medium.

The washer 11 engages a shoulder 19 of the rod D and has a diameter slightly less than the inside diameter of the cylinder A to provide at its periphery a passage 20 for the hydraulic medium. Such washer 11 also has a circular series of holes 21 therein through which the hydraulic medium may flow to and from the inner series of ports 13 in the section B of the piston. The washer 12 is at the upper end of and substantially equal in diameter to the sleeve E on the rod. The washer 15 is at the lower end of the sleeve E and like the washer 11 has a diameter slightly less than the inside diameter of the cylinder A to provide at its periphery a passage 22 for the hydraulic medium. This washer 22 also has a circular series of holes 23 therein through which the hydraulic medium may flow to and from the inner series of ports 17 in the piston section C. The retaining nut 16 threadedly engages the reduced portion 10 of the rod at its lower end and holds all of the elements just mentioned on said reduced portion between the nut and shoulder 19 against displacement.

Located between the upper side of the upper piston section B and a smaller washer 24 on the underside of the washer 11 is a resilient disk valve M having a curved slot 25 therein registering with the inner series of ports 13 and having an imperforate outer portion 26 normally held by the fingers 27 of a spring backer 28 in closed position over the outer series of ports 14 in the upper piston section, while between the underside of the piston section B and the washer 12 is a two-ply leaf spring valve 30 for controlling the inner series of ports 13 in the upper piston section B. Preferably the underside of the washer 11 is recessed as at 31 to receive the fingers 27 of the spring backer 28 when the valve M is opened.

Located between the upper side of the lower piston section C and a smaller washer 32 on the underside of the washer 15 is a resilient disk valve N corresponding to the valve M and having a curved slot 34 therein registering with the inner series of ports 17 and having an imperforate outer portion 35 normally held by the fingers 36 of two spring backers 37 and 38, respectively, in closed position over the outer series of ports 18 in the lower piston section C, while between the underside of the lower piston section C and the nut 16 is a three-ply leaf spring valve 40 for controlling the inner series of ports 17 in the lower piston section C. Preferably the underside of the washer 15 is recessed as at 41 to receive the fingers 36 of the spring backers 37 and 38 when the valve N is opened.

The lower closed end of the reserve chamber J is rigid with a circular head K that is adapted to be attached to the unsprung weight of a vehicle, while the outer end of piston rod D is rigid with a similar head R that is adapted to be connected to the sprung weight of the vehicle. In the present instance, the reduced lower end portion 10 of the piston rod is provided longitudinally therefrom its lower end to a point adjacent the upper end of the sleeve E with a milled slot 50 for the hydraulic medium. The sleeve E has an annular channel 49 in open communication with the slot 50 in the rod and has orifices 51 extending radially therefrom. The slide F on the sleeve has radially extending orifices 52 for registration with the orifices 51. Normally when the shock absorber is stationary, the slide F is held by coil springs 60 and 61 in neutral or balanced position, as illustrated in Figure 1, so that the orifices 52 in the slide are in full registration with the orifices 51 in the sleeve. Thus, the hydraulic medium is free to flow in the normal manner for the low stage action of the shock absorber. However, when the action of the shock absorber exceeds such low stage to any degree up to the high stage mentioned, then the slide F will move lengthwise of the sleeve E to partially or fully close the opening 51 therein depending upon the degree reached. If desired, more than one milled slot 50 may be provided in the rod. Any number of orifices 51 and 52, respectively, may be provided in the sleeve E and slide F.

In use, the spring pressed disk M serves as a low stage compression valve and thus determines the first resistance stage during compression; the laminated spring 30 serves as a low stage rebound valve and determines the first resistance stage during rebound; the spring pressed disk N serves as a high stage compression valve and determines the second resistance stage during compression; and the laminated spring 40 serves as a high stage rebound valve and determines the second resistance stage during rebound. When easy or boulevard riding conditions are encountered and the shock absorber is moving slowly on the compression stroke, the hydraulic fluid passes upwardly through the milled slot 50 and then through the registered orifices 51 and 52 in the sleeve E and slide F. Due to the limited space at 70 between the outer ends of the orifices 52 in the slide and the adjacent walls of the cylinder A, the fluid is unable to flow fast enough through said space 70, hence the upward surge or velocity of the fluid tends to force the slide F upwardly and thereby close the orifices 51 in the sleeve E. However, this tendency is slight under easy or boulevard riding conditions so the fluid merely passes up through the outer series of ports 14 in the upper piston section B past the first resistance stage valve M to refill the space in the cylinder A above the piston. Should the shock absorber speed increase due to rougher riding conditions, then the fluid velocity will increase proportionately and will cause the slide F to partially or fully close the orifices 51 in the sleeve E. When the orifices 51 are fully closed, the second resistance stage is reached because at that time all fluid must pass up through the outer ports 18 in the lower section C of the piston past the high compression or second resistance stage valve N. On the rebound or return movement of the shock absorber, the spring valve 30 determines the first resistance stage. When easy or boulevard riding conditions are encountered the fluid passes downwardly past the valve 30 and thence downwardly in the space 70 to the registering orifices 52 and 51 to the passage 50. However, when rougher riding conditions are encountered then the fluid velocity increases to such an extent that the fluid can not pass fast enough through the space 70. Consequently the pressure of the liquid builds up on top of the slide F to such an extent that the slide will be moved downwardly to partially or fully close the orifices 51. Then the liquid must pass downwardly through the ports 17 past the second resistance stage valve 40.

What I claim as my invention is:

1. A hydraulic shock absorber having a compression cylinder containing a hydraulic medium, two piston sections spaced apart within said cylinder, each having valve controlled passages therethrough for said medium, means for by-passing hydraulic medium through one of said sections to the space between said sections, and means responsive to the velocity of the medium in the cylinder for controlling the flow of said medium through said by-passing means.

2. A hydraulic shock absorber having a compression cylinder containing a hydraulic medium, two piston sections spaced apart within said cylinder, each having valve controlled passages therethrough for said medium, means for by-passing hydraulic medium through one of said sections to the space between said sections, means responsive to the velocity of the medium in the cylinder for controlling the flow of said medium through said by-passing means, and spring means normally holding the responsive means in a predetermined position so the flow of the medium will be through the by-passing means to the passages in only one of said piston sections.

3. A hydraulic shock absorber having a compression cylinder containing a hydraulic medium, two piston sections arranged in tandem within said cylinder, each having valve controlled passages therethrough for said medium, and means normally permitting the hydraulic medium to by-pass through one of said sections to the passages in the other section, said means being responsive to the velocity of the hydraulic medium to restrict or close the by-pass so the medium will flow through the passages in both of said sections.

4. A hydraulic shock absorber having a compression cylinder containing a hydraulic medium, two piston sections in tandem within said cylinder, each having valve controlled passages therethrough for the medium, and means controlling the flow of the medium through said passages including a by-pass for the medium through one of said sections, and a valve for said by-pass responsive to the velocity of the medium.

5. A hydraulic shock absorber having a compression cylinder containing a hydraulic medium, two piston sections in tandem within said cylinder, each having valve controlled passages therethrough for the medium, and means controlling the flow of the medium through said passages including a common carrier for the piston sections having a by-pass for the medium extending through one of said sections to the space between said sections, and a valve for the by-pass in said space and operable by said medium.

6. A hydraulic shock absorber having a compression cylinder containing a hydraulic medium, two piston sections in tandem within said cylinder, each having valve controlled passages therethrough for the medium, and means controlling the flow of the medium through said passages including a common carrier for the piston sections having a by-pass for the medium extending through one of said sections to the space between said sections, a valve for the by-pass in said space and movable by the medium to closed position, and spring means operable when the velocity of the medium is low for moving the valve to open position.

7. A hydraulic shock absorber having a compression cylinder containing a hydraulic medium, a piston rod movable in said cylinder and having a longitudinally extending slot therein for said medium, a sleeve on the rod at one end of the slot having an opening for the medium in open communication with the slot, piston sections on the rod at opposite ends of the sleeve and having valve controlled passages for the hydraulic medium, and a slide on the sleeve responsive to the velocity of the hydraulic medium and having an opening for the medium normally in registration with the opening in the sleeve.

8. A hydraulic shock absorber having a compression cylinder containing a hydraulic medium, a piston rod movable in said cylinder and having a longitudinally extending slot therein for said medium, a sleeve on the rod at one end of the slot having an opening for the medium in open communication with the slot, piston sections on the rod at opposite ends of the sleeve and having valve controlled passages for the hydraulic medium, a slide on the sleeve responsive to the velocity of the hydraulic medium and having an opening for the medium normally in registration with the opening in the sleeve, and coil springs extending from the piston sections to the slide and operable when the velocity of the medium is low to return the slide to its normal position.

9. A hydraulic shock absorber having relatively movable parts, one being a pressure cylinder, the other being a piston in said cylinder, said piston having vertically spaced sections, each section having two sets of vertical passages therethrough for a hydraulic medium, valves on the top and bottom of said sections controlling said passages, those on top controlling one set, those on the bottom controlling the other set, an operating rod for the piston provided from a point between the spaced sections of the piston to the lower end of the rod with a longitudinally extending slot in open communication with a part of the cylinder below the piston, and means for controlling the flow of hydraulic medium through certain of said valve controlled passages, including a sleeve anchored on the rod between the sections of the piston and having a radial orifice in open communication with the slot in the rod, a slide movable vertically on the sleeve and having a radial orifice adapted to register with the radial orifice in the sleeve, and yieldable means extending from the piston sections to the slide for normally holding the orifice in the slide in registration with the orifice in the sleeve, the radial orifice in the slide being so close to the adjacent wall of the pressure cylinder that the flow of hydraulic medium therebetween under certain pressure conditions is restricted sufficiently to cause a build up of pressure against the slide to move the same vertically relative to the sleeve to partially or fully close the orifice in said sleeve.

10. A hydraulic shock absorber having relatively movable parts, one being a pressure cylinder, the other being a piston in said cylinder, said piston having vertically spaced sections, each section having two sets of vertical passages therethrough for a hydraulic medium, valves on the top and bottom of said sections controlling said passages, those on top controlling one set, those on the bottom controlling the other set, an operating rod for the piston provided from a point between the spaced sections of the piston to the lower end of the rod with a longitudinally extending slot in open communication with a part of the cylinder below the piston, and means for controlling the flow of hydraulic medium through certain of said valve controlled passages, including a sleeve on the rod between the sections of the piston and having an orifice in open communication with the slot in the rod, a slide movable on the sleeve and having an orifice adapted to register with the orifice in the sleeve, and means normally holding the orifice in the slide in registration with the orifice in the sleeve, the orifice in the slide being so close to the adjacent wall of the pressure cylinder that the flow of hydraulic medium therebetween under certain pressure conditions is restricted sufficiently to cause a build up of pressure against the slide to move the same relative to the sleeve to partially or fully close the orifice in said sleeve.

11. A hydraulic shock absorber having a cylinder containing a hydraulic medium, two piston sections spaced apart within said cylinder, each section having valve controlled passages therethrough for the hydraulic medium, a rod for both sections having means for by-passing hydraulic medium through one of said sections to the space between said sections, and means responsive to the velocity of the medium in the cylinder for controlling the flow of the hydraulic medium through said by-passing means.

12. A hydraulic shock absorber having a cylinder containing a hydraulic medium, two piston sections spaced apart within said cylinder, each section having valve controlled passages therethrough for the hydraulic medium, a rod for both sections having means for by-passing hydraulic medium through one of said sections to the space between said sections, and a slidable valve responsive to the velocity of the medium in the cylinder for controlling the flow of the hydraulic medium through said by-passing means.

13. A hydraulic shock absorber having a pressure cylinder containing a hydraulic medium, two piston sections spaced apart within said cylinder, each section having valve controlled passages therethrough for the hydraulic medium, a rod for both sections, a sleeve on the rod between said sections and having an orifice for hydraulic medium, the rod having means for by-passing hydraulic medium through one of the sections to the orifice in the sleeve and vice versa, and means responsive to the velocity of the medium in the cylinder for controlling the flow of the hydraulic medium through the orifice in said sleeve.

14. A hydraulic shock absorber having a pressure cylinder containing a hydraulic medium, two piston sections spaced apart within said cylinder, each section having valve controlled passages therethrough for the hydraulic medium, a rod for both sections, a sleeve on the rod between said sections and having an orifice for hydraulic medium, the rod having means for by-passing hydraulic medium through one of the sections to the orifice in the sleeve and vice versa, and a valve slidable on the sleeve for controlling the flow of the hydraulic medium through the orifice in said sleeve, said slidable valve being responsive to the velocity of the hydraulic medium in the cylinder.

15. A hydraulic shock absorber having a pressure cylinder containing a hydraulic medium, two piston sections spaced apart within said cylinder, each section having valve controlled passages therethrough for the hydraulic medium, a rod for both sections, a sleeve on the rod between said sections and having an orifice for hydraulic medium, the rod having means for by-passing hydraulic medium through one of the sections to the orifice in the sleeve and vice versa, a valve slidable on the sleeve and having an orifice normally registering with the orifice in the sleeve, said slidable valve being responsive to the velocity of the hydraulic medium in the cylinder, and yieldable means extending from the piston sections to the valve and normally holding the slidable valve in a predetermined position so that the registration aforesaid of the orifices is obtained.

16. A hydraulic shock absorber having a pressure cylinder containing a hydraulic medium, two piston sections spaced apart within said cylinder, each section having valve controlled passages therethrough for the hydraulic medium, a rod for both sections, a sleeve on the rod between said sections and having an orifice for hydraulic medium, the rod having means for by-passing hydraulic medium through one of the sections to the orifice in the sleeve and vice versa, a valve slidable on the sleeve and having an orifice normally registering with the orifice in the sleeve, said slidable valve being responsive to the velocity of the hydraulic medium in the cylinder, and spring means normally holding the slidable valve in a predetermined position so that the registration aforesaid of the orifices is obtained.

17. A hydraulic shock absorber having a pressure cylinder containing a hydraulic medium, two piston sections spaced apart within said cylinder, each section having valve controlled passages therethrough for the hydraulic medium, a rod for both sections, a sleeve on the rod between said sections and having an orifice for hydraulic medium, the rod having means for by-passing hydraulic medium through one of the sections to the orifice in the sleeve and vice versa, a valve slidable on the sleeve and having an orifice normally registering with the orifice in the sleeve, and means normally holding the slidable valve in a predetermined position relative to the sleeve so that the registration aforesaid of the orifices is obtained, the orifice in the slidable valve being so close to the adjacent wall of the pressure cylinder that the flow of hydraulic medium therebetween under certain pressure conditions is restricted sufficiently to cause hydraulic medium in the cylinder to build up sufficient pressure against the slidable valve to slide the same relative to the sleeve to partially or fully close the orifice in the sleeve.

RALPH H. WHISLER, Jr.